April 17, 1962 A. W. TREPTOW 3,029,559
GLASS-METAL SEALS
Filed July 25, 1956
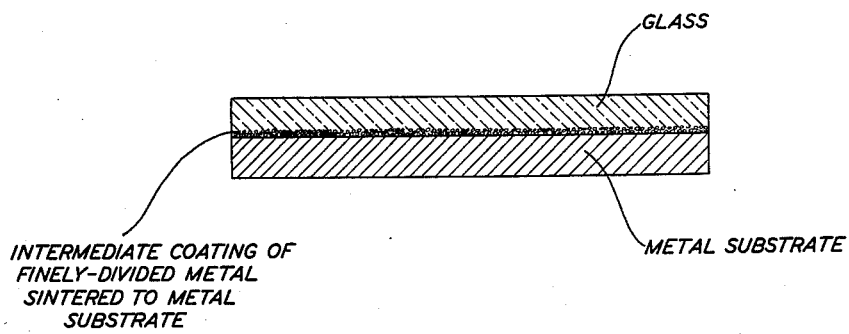
GLASS
INTERMEDIATE COATING OF
FINELY-DIVIDED METAL
SINTERED TO METAL
SUBSTRATE
METAL SUBSTRATE
INVENTOR
A. W. TREPTOW
BY
ATTORNEY

3,029,559
GLASS-METAL SEALS
Arnold W. Treptow, Fanwood, N.J., assignor to Bell Telephone Laboratories, Incorporated, New York, N.Y., a corporation of New York
Filed July 25, 1956, Ser. No. 599,954
3 Claims. (Cl. 49—81)

This invention relates to an improved method for bonding glass to metal, and to improved glass-to-metal seals produced by said method.

In their simplest form, glass-metal seals consist merely of a joinder or bond of metal with a glass compatible in expansivity, or nearly so, with the metal to which it is joined. Such minimum quality seals may show many defects, particularly with regard to the bond or degree of adherence of the glass to the substrate metal of the seal.

Improvements in the quality of adherence of glass to metal have been sought earlier in the art by making some modification of the metal surface prior to bonding. Coatings of oxides have been formed on the metal, prior to bonding to glass, by heating the metal in air or some other oxidizing medium. Thin films of other metals have been laid on metal substrates by plating, for example, before joining the substrate to glass. Usually, again, there has been some prior oxidation of the metal film to an oxide which hopefully would aid in forming an adherent bond to glass, resulting in a tight metal-glass seal.

Though successful and adequate for many purposes, even these improved seals still show defective adherence under moderately adverse conditions. Where large area seals are made, for example, a departure of the glass and metal at the interface, due to a poor bond, is often observed. Where metal sheets or wires are glass-coated, even slight flexion of the sheets or wires may cause extensive flaking and chipping of the glass coat due to failure of adherence, with loss of protection to the underlying metal.

The present invention concerns a method of making a novel glass-metal bond which greatly improves the adherence of glass to the substrate metal involved, making possible some seals heretofore only difficultly made, and improving the quality of many other seals. The invention calls for the application of a thin layer of finely-divided metal to the surface of the metal to be bonded, the sintering of the applied metal layer to the substrate metal under reducing conditions, and the subsequent joinder of the sintered structure to glass. The joinder to glass may be done either by direct application of the glass to the prepared metal or by application of an intermediate bonding coating of finely-divided glass, with fusion thereof, and subsequent joinder of the main glass body to this intermediate fused glass coating.

These features—a metal substrate, a layer of finely-divided metal sintered to said metal substrate, and an overlying coating of glass to form an adherent glass-metal bond are shown in the accompanying figure.

As substrate metals to which glass may be bonded by the new technique, any metal to which another finely-divided metal will sinter may be used. "Kovar," an alloy of approximately 54 percent iron, 18 percent cobalt and 28 percent nickel, commonly used for bonding to glass, has been particularly improved by the methods of this invention. Other metals, including nickel-iron alloys, molybdenum, tungsten, a 70–30 alloy of nickel and copper, and stainless steel, all less commonly thought of as suitable for establishing seals to glass, are also exemplary of the wide variety of metals which can be successfully bonded to glass using the present invention. Further, silver, copper, columbium, gold, iron, palladium, and platinum are all capable of sintering with particulate metals distributed on their surface and can be used with particular effectiveness in practicing the invention.

For the powdered or otherwise finely-divided metals which are useful as bonding agents in the new technique, nickel, iron, cobalt, platinum, molybdenum, tungsten, copper, silver, and gold can be given as examples which give especially good results. The basic requirement for the finely-divided metal is that it be sinterable to the substrate employed. Certain combinations of coating metal and substrate metal will be especially advantageous, as, for example, finely-divided nickel on Kovar, a combination which has proved pre-eminently useful in making good glass-metal seals according to the method herein described.

The particulate metals may be either flakes, granules, or powders, ranging in dimension between about 1 micron and about 40 microns in the average size of their longest dimension. Particles between about 1 micron and about 20 microns in size have proved especially useful. An optimum range for production of the best glass-metal bonds appears when the particles are between about 5 microns and about 12 microns in size.

The finely-divided metals are most conveniently applied to the surface of the substrate using an organic polymeric binding agent which decomposes or depolymerizes during the subsequent sintering step. As binders, vinyl or substituted vinyl polymers, such as polymethylmethacrylate, polybutylmethacrylate, polyisobutylmethacrylate, and polyethylmethacrylate are satisfactory heat-depolymerizable materials. For the solution of such binders, organic solvents which are suitable are "Cellosolve acetate" (ethylene glycol monoethyl ether acetate), "Carbitol acetate" (diethylene glycol monoethyl ether acetate), benzene and some of the higher alcohols. Rohm and Haas "Acryloid A-10," a solution of 30 percent polymethylmethacrylate solids in "Cellosolve acetate" has proved to be a particularly good suspending vehicle. For example, some of the finely-divided metals have been applied using a suspension of 40 grams of the powdered metal in 10.0 grams of "Acryloid A-10" thinned with 15.0 cubic centimeters of "Cellosolve acetate." Thicker or thinner solutions may be employed, or more or less binder per unit weight of metal may be used, at the discretion of the person applying, to adapt the material to special techniques for application.

For application, suspensions of the metal may be sprayed or brushed on the substrate surface, or the substrate may be dipped in the suspension. If flat sheets of substrate metal are to be covered, merely sprinkling the finely-divided metal uniformly over the surface of the sheets, without the use of a binder, may be sufficient to apply the particulate metal to the substrate, gravity sufficing to hold the coating in place.

The thickness of the metal particle coating applied is conveniently expressed as a weight of coating per unit area of substrate, as thickness measured in units of length may vary with the size of the particles applied in the coating. Generally an amount between about 1 milligram per square inch and about 100 milligrams per square inch of finely-divided metal is applied to the substrate surface. In many applications coatings between about 5 milligrams per square inch and about 50 milligrams per square inch may give better results. Most uses will employ coats with only between about 10 milligrams per square inch and about 20 milligrams per square inch of metal deposited on the substrate, as this range has proved especially good for a wide variety of uses. Generally speaking, coatings of the metal on a substrate will be anywhere from about one-tenth mil in thickness to two mils in thickness, depending both on the particle size of the metal employed and the particular area density used within the limits set about above.

If coatings are too thick, the glass to be bonded later will be applied merely to the coating, whereas what is desired is a joint bonding of the glass both to the substrate and to the metal sintered thereon. If the coatings are too thin, of course, the benefits of the additional coat of sintered material are less evident, and the bond approaches those already known in the art.

To some degree, the coating depends for its efficacy on a roughness of texture which aids the formation of a strong glass-metal bond. For this reason, there should be not too wide a departure from the limits set forth earlier above on particle size. Too small particles will give too smooth a surface to gain the full benefits of the sintered coating. Too large particles are also undesirable as giving either too inhomogeneous a texture for the surface or an uneven distribution of the coating on the substrate. The beneficial character of the coating is not to be understood as reliant only on the coating's roughening effect on the substrate, however. Simple roughening of the substrate, without more, has been tried before. Its effects have been found inferior to those achievable with the rough sintered coatings now proposed. Some other factors beside roughening of the substrate are responsible for the efficacy of sintered coatings. For example, keeping the coatings thin enough to be discontinuous on the substrate surface is certainly a factor. Such discontinuities afford an opportunity for glass to bond both to the sintered coating and the uncovered substrate: this condition is believed to be especially conducive to good glass-metal bonding.

Once applied to the substrate, the metal particles are sintered to the substrate in a furnace in which controlled atmospheres may be maintained. The temperatures required for sintering may range from a minimum of about 750° C. to 1500° C., the higher temperatures being required for difficultly-sinterable materials like tungsten and molybdenum. The temperatures needed to sinter the metal particle coatings vary with the ease of sinterability of the particles and the receptiveness of the substrate. These properties may be roughly correlated with the ease of fusibility of the metals involved. However, some relatively infusible metals may nevertheless show sufficient diffusibility to sinter at temperatures relatively low in comparison with their melting point. A perfect correlation between comparative sinterability and comparative fusibility for a series of metals cannot be made, but melting point will furnish some guide to the magnitude of the temperature needed to sinter a metal. In practicing the method herein described, most of the metals used sinter adequately in the range between about 900° C. and 1350° C., and particularly good coatings result from sintering at temperatures between 1000° C. and 1250° C. Desirable sintering temperatures for the metals and particle sizes employed are known in the art.

Varying with the metal sought to be sintered and the temperature used for sintering, the time for which a coating is sintered may vary between 5 minutes and 24 hours. For practical purposes, the sintering temperatures are usually chosen so that sintering is finished in a time between 10 minutes and 2 hours. Most coatings can be conveniently sintered in between 15 and 30 minutes by staying within the temperature limits disclosed above.

Sintering is done in a non-oxidizing atmosphere or, preferably, a reducing atmosphere, to inhibit the formation of oxide films on the sintered surface. This, as mentioned earlier, is a further point of departure from prior art glass-metal seals which, in many cases, relied exclusively on the formation of some oxide film as a bonding agent.

Suitable reducing gases for use in the sintering process include carbon monoxide and hydrogen, for example. The reducing gases need not, in all cases, be used pure, but may be mixed in a wide range of proportions with inert gases such as the rare gases or nitrogen, if desired. A "forming gas" mixture of 85 percent $N_2$ and 15 percent $H_2$, by volume, has been used many times as the sintering atmosphere with particularly good results; a similar mixture containing 70 percent $N_2$ and 30 percent $H_2$ is also useful for sintering. If perfectly "clean" metals are employed, no reducing component need be present to prevent oxide film formation if only an inert gas blanket is kept. In practice, the metals used are nearly always filmed with oxide, no matter how careful their preparation, and a reducing component in the sintering atmosphere is desirable to remove these oxide films. In some cases, such as for chromium or alloys containing chromium, specifically, the metal substrate or particulate metal being sintered is readily oxidizable and a dry reducing atmosphere, such as of dry hydrogen, with or without added dry nitrogen, is preferred for firing. For less readily oxidized metals, the atmosphere may contain small quantities of oxidizing components, such as water vapor if reducing gases present in the mixture impart a predominant reducing characteristic to the mixture. The end to be attained is the removal of any oxide films possibly present before sintering and the prevention of oxide film formation during sintering: the variations to be made in the nature and approximate composition of the protective atmospheres to adapt them to the metals being treated are within the knowledge of one skilled in the art, aided by the considerations given above.

When, finally, glass is to be joined to the sinter-coated substrate described above, the choice of glass to be used should be guided by the structure and function of the seal being established. A choice between alternative techniques for applying the glass is also tempered by considerations of the nature of the final product.

A suitable glass, when molten, will "wet" the sintered surface of the substrate, and will match the coefficient of expansion of the substrate and sintered coating to a varying degree. For simple structures, such as thin insulating coatings on metal wires, considerable mismatch in expansion coefficients can be tolerated. For more complex structures such as eyelet type seals, for example, the degree of match for glass and metal may be more critical. Some thought should also be given to the temperature range in which the seal is to operate, and to whether or not the seal will be subjected to thermal shocks. Peculiarities of either may require a greater degree of matching in expansion coefficients between glass and metal than is required for other applications and uses.

Typical of non-reducible glass compositions which have proved particularly acceptable for use in making seals as described are borosilicate glasses such as "Corning 7052," "Corning 7050," and "Corning 7056." In some cases, where firing of the glass can be done in a pure inert atmosphere rather than one containing reducing agents, reducible soda lime glasses containing lead oxide can be used with advantage.

Exemplary of some borosilicate glasses which can be used to advantage in the invention are those having the following theoretical melt compositions:

TABLE 1

| Ingredients as Oxides | Compound (Parts by Weight) | | | | | |
|---|---|---|---|---|---|---|
| | A | B | C | D | E | F |
| $B_2O_3$ | 14 | 15 | 22 | 30 | 30 | 22 |
| $SiO_2$ | 80 | 68 | 67 | 30 | 50 | 67 |
| $Na_2O$ | 4 | 2 | 7 | | | |
| $K_2O$ | | | | | | 7 |
| $Al_2O_3$ | 2 | 8 | 2 | 10 | 10 | 2 |
| BaO | | 2 | | 30 | 10 | |
| $Li_2O$ | | 8 | | | | |
| Total | 100 | 103 | 98 | 100 | 100 | 98 |

Exemplary of a soda lime glass which can be used when fired in an inert atmosphere is the theoretical melt composition given below, which is approximate:

TABLE 2

Ingredients as oxides:     Parts by weight
- PbO — 7
- $SiO_2$ — 82
- CaO — 5
- $Al_2O_3$ — 1
- $Na_2O$ — 7
- MgO — 3

Total — 105

Which of the glasses mentioned above, or exemplified specifically above, is compatible to a sufficient degree with the particular sintered substrate chosen is a matter of discretion for one skilled in the art practicing the invention. The problems facing the artisan are no different than those which the prior art presents: from the available glasses and metals he must find a pair with a compatibility sufficient to meet the demands which the structure and function of the intended seal must fulfill. The most satisfactory solution of those problems has been empirical—a trial and error to determine whether a given seal will withstand the rigors of the testing conditions. Because of the greater degree of adherence achieved in the glass-metal seals discussed herein, a greater leeway in suitable choice is now made available to the artisan. Care must still be taken, however, not to choose materials of greatly disparate compatibility in expansion characteristics.

For structures of a simpler variety, the glasses recommended above may be joined to the sinter-coated substrate by conventional methods. The simplicity of the structure assures that a good wetting of the metal by the glass is obtained so that good contact between the materials is made.

For more complex structures, the mere contacting of molten glass to the substrate may not be sufficient to bring about a joinder and firm bond, and an alternative procedure is recommended. A portion of the glass to be applied is ground fine and a suspension of the ground material applied to the metal surface. On heating to fuse the powdered glass, a joinder of the glass to the metal in a thin coating results. Application of such a preliminary thin glass coating helps to ensure that a good bond—a good physical contact—is made between the glass and the sinter-coated and uncoated portions of the metal substrate. After this contact is established, the remainder of the glass to be joined can be sturdily and easily sealed to the thin glass film already bonded to the metal portion of the seal. Another advantage afforded by the application of a preliminary glass coating is the elimination of undesirable air bubbles trapped between the metal substrate and the applied glass. Such air bubbles, which form rather readily when bulk glass is sought to be fused to the prepared metal, form less readily and can be more easily removed by heating when a thin glass coating is first formed by the methods suggested herein.

Application of finely-divided glasses to the sinter-coated metal follows closely the same methods used to apply the finely-divided coating metals prior to sintering. The same binders and solvents there mentioned can be used in the same or in different proportions to apply the glasses also, with a mere substitution of finely-divided glass for finely-divided metal. Even more simple techniques can be used: a suspension of 100 grams of finely-divided glass in 100 cubic centimeters of water has been used successfully in the application of the glasses.

In order that satisfactory suspensions may be produced, the glasses are preferably ground to such fineness as will enable them to pass through a No. 325 sieve on the U.S. Standard Screen Scale. Such sieves have mesh openings of 0.044 millimeter.

Application of suspensions of the glass may be by brushing, dipping, or spraying such that between about 50 milligrams per square inch and about 200 milligrams per square inch of glass are applied. In suitable cases, a simple dusting of the metal with the ground glass may be sufficient. Coatings with an area density of the order of magnitude given above fire to fused glass coatings between about one mil and about 5 mils thick.

The glasses mentioned above are fusible in the temperature range between about 750° C. and about 1200° C., and firing will be within that range. Most fuse successfully in the temperature range between 800° C. and 1000° C. The time for which firing is continued should be sufficient to fuse the glazes applied and to remove any trapped air bubbles in the coating. The time for firing is highly dependent on firing temperature, but will generally range between 1 minute and 2 hours. Practically speaking, nearly all fusions will be accomplished in less than 30 minutes.

When the metals being coated are exposed to high temperatures for relatively extended time periods, firing should be carried out in a non-oxidizing atmosphere, either inert or reducing. When using glasses which are resistant to reduction, such as the borosilicate glasses, mixtures of reducing gases and inert gases can be used to ensure that no metal oxides are formed. As in the metal-sintering step, mixtures of nitrogen and hydrogen have been found especially convenient, though other obvious substitutes exist. For glasses containing oxides susceptible to reduction by reducing atmospheres, such as lead oxide, firing is best carried out in a purely inert atmosphere, such as of nitrogen. When firing metals which are exceptionally reactive and oxidation susceptible, for example stainless steel, cobalt, or chromium, traces of oxidizing materials are preferably absent from the firing atmosphere, as mentioned earlier herein. For many of the other metals, it is sufficient that the firing atmoshpere be predominantly reducing, but care to exclude all oxidizing agents need not be exercised. Thus, for the metals specifically herein mentioned, excepting chromium, stainless steel, and cobalt, firing has been conveniently done in mixtures of nitrogen and wet hydrogen. The predominantly reducing character of such an atmosphere is sufficient to overcome any oxidative effects introduced by the presence of water vapor. The term "non-oxidizing atmosphere" as used herein is intended to be inclusive of atmospheres whose effects on the materials fired are those of a purely reducing or inert gas as well as those atmospheres composed solely of purely reducing or inert components.

Cooling of the glass-coated structures is not critical, as long as thin coatings are obtained. For thicker glass layers proportionately greater care must be taken on cooling to prevent thermal shock.

After cooling, a regular glass-to-glass seal can be made between the bulk of the remaining glass to be sealed and the thin glass coat now bonded to the metal.

In Table 3 are shown the results of comparative strength tests on seals prepared by the methods of the present invention and prior art seals relying on oxide coatings to provide bonding strength. The seals were butt seals manually made to the bases noted using "Corning 7056" glass. Stress was applied by machine at a constant rate of application in a direction substantially perpendicular to the glass-metal interface. The nonsintered bases were Kovar pre-oxidized in air, and designated "light" or "heavy" depending on the time for which such oxidation had been allowed to proceed. The sintered base was of Kovar sinter-coated with nickel.

TABLE 3

| Base | No. of Samples | No. of Samples Breaking |
| --- | --- | --- |
| light oxide coating | 9 | 9 |
| heavy oxide coating | 6 | 6 |
| sintered nickel coating | 9 | [1] 5 |

Average Seal Breaking Stress:
  460 pounds per square inch
  495 pounds per square inch
  880 pounds per square inch

[1] 4 of the sintered nickel samples failed to break before the structure used to grip the samples in the testing apparatus failed. The breaking stress shown is the average for the samples which could be stressed to the breaking point.

In the specific examples which follow of glass-to-metal seals and bonds made according to the method of the invention, it is to be understood that the examples are illustrative only, and are not to be construed as limiting the scope and spirit of the invention.

*Example 1*

40 grams of nickel powder, comprised of particles between 4 microns and 6 microns in size, were suspended in a mixture of 10 grams of "Acryloid A-10" with 15 cubic centimeters of "Cellosolve acetate." A thin coating of the mixture was applied to a molybdenum wire till the metal powder density on the wire was between 10 milligrams per square inch and 30 milligrams per square inch. The coating of nickel was then sintered to the metal substrate by firing at 1100° C. for 20 minutes in an atmosphere of 70 percent nitrogen and 30 percent wet hydrogen. A suspension composed of 150 grams of the glass shown as Compound E in Table 1, ground to 325 mesh, was prepared in a thin vehicle of 25 grams of "Acryloid A-10" and 100 grams of "Cellosolve acetate." The sintered nickel-molybdenum substrate was sprayed with a portion of this suspension, till a coating of the glass between about 40 milligrams per square inch and about 60 milligrams per square inch in area-density had been applied. The wire was then again fired in an atmosphere of 70 percent nitrogen and 30 percent wet hydrogen at 1100° C. for about 20 minutes. The wire was finally sealed into a ceramic disc by heavy application of the glass identified as compound E of Table 1 powdered and suspended in the same vehicle mentioned earlier herein.

*Example 2*

A coating of between 10 milligrams per square inch and 20 milligrams per square inch of finely-divided nickel of particle size between 4 microns and 6 microns was applied to the outer rim of a cylindrical "Kovar" ring as a suspension in "Acryloid A-10" and "Cellosolve acetate." The concentration of metal and relative proportions of other ingredients was the same as given in Example 1 for application of the metal powder there mentioned. This coating was then sintered at 1100° C. for 20 minutes in an atmosphere of 70 percent nitrogen and 30 percent wet hydrogen. A coating 70 milligrams per square inch to 100 milligrams per square inch in thickness of the glass identified as compound D of Table 1 was next applied to the sintered substrate as a suspension of the glass, ground to pass a 325 mesh Standard Screen, in "Acryloid A-10" and "Cellosolve acetate." As in Example 1, the suspension was prepared from 150 grams of the glass, 25 grams of "Acryloid A-10" and 100 grams of "Cellosolve acetate." This coating was fired at 900° C. in an atmosphere of 70 percent nitrogen and 30 percent wet hydrogen for 30 minutes, by which time all bubbles had disappeared from the coating. No aditional glass was applied to the coated cylinder.

*Example 3*

A shallow thin-walled cup made from an alloy of 52 percent nickel, the balance iron, was coated on its interior with a layer of finely-divided nickel comprising particles between 4 microns and 6 microns in size. As in Examples 1 and 2, the nickel was applied in a suspension of "Acryloid A-10" and "Cellosolve acetate," of the same composition as given earlier. The coating, of a density between 10 milligrams per square inch and 20 milligrams per square inch, was then fired for one-half hour in an atmosphere of 70 percent nitrogen and 30 percent wet hydrogen.

The cavity of the cup was then filled with a glass of the following theoretical melt composition by introducing a rod of the glass into the cup, and then fusing the rod by heating the cup and rod in air with a flame.

| Ingredients as oxides: | Parts by weight |
| --- | --- |
| $SiO_2$ | 56.5 |
| $K_2O$ | 8.6 |
| $Na_2O$ | 5.4 |
| PbO | 29.5 |
| | 100.0 |

*Example 4*

Several "Kovar" rods, each 40 mils in diameter, were individually coated with a different finely-divided metal. The metals were applied, in coatings with a density between 8 milligrams per square inch and 10 milligrams per square inch, as suspensions of the metal in "Cellosolve acetate" and "Acryloid A-10," as in previous examples. The samples were fired under the conditions tabulated below:

| Metal | Firing Time, minutes | Firing Temperature, °C. |
| --- | --- | --- |
| Cobalt | 30 | 1230 |
| Tungsten | 30 | 1230 |
| Molybdenum | 30 | 1230 |
| Nickel | 30 | 1100 |

Atmosphere:
  50 percent $N_2$—50 percent dry $H_2$
  50 percent $N_2$—50 percent wet $H_2$
  50 percent $N_2$—50 percent wet $H_2$
  50 percent $N_2$—50 percent wet $H_2$ A fritted glassy mixture was next applied to the rods, a principal component of the mixture being a glass of the following theoretical melt composition:

| Ingredients as oxides: | Parts by weight |
| --- | --- |
| $Li_2O$ | 3.5 |
| CaO | 5.8 |
| BaO | 6.7 |
| MgO | 1.2 |
| $Al_2O_3$ | 7.5 |
| $SiO_2$ | 44.3 |
| $B_2O_3$ | 31.0 |
| | 100.0 |

The glassy mixture had been ground to pass a 325 mesh Standard Screen and was incorporated into a thick suspension into which the sintered rods were dipped. The suspension contained 24 grams of the glassy mixture to 15 cubic centimeters of a suspending medium made by mixing 75 grams of "Acryloid A-10" with 130 cubic centimeters of "Cellosolve acetate." All glass coatings were fired on at 740° C. by heating at this temperature for 10 minutes in an atmosphere of 50 percent nitrogen and 50 percent wet hydrogen. When flexed by hand through a considerable arc, the coatings on the sintered "Kovar" rods showed much greater adherence than did similar glass coatings on an unsintered "Kovar" substrate. Though cracking of the coat was observed for the flexed sintered samples, the coat remained highly adherent to the underlying rod, resisting flaking and spalling.

What is claimed is:

1. An improved glass-to-metal seal consisting of a metal substrate, a layer of finely-divided metal particles sintered on the surface of said substrate, said particles being between 1 micron and 40 microns in size, and glass fused to said substrate and the sintered particles on the surface of said substrate.

2. An improved glass-to-metal seal as described in claim 1 wherein said metal substrate is an alloy of approximately 54 weight percent iron, 18 weight percent cobalt, and 28 weight percent nickel, and said finely-divided metal particles are particles of nickel.

3. An improved glass-to-metal seal consisting of a metal substrate, a layer of finely-divided metal particles sintered on the surface of said substrate, said layer containing between 1 milligram per square inch and 100 milligrams per square inch of metal particles between 1 micron and 40 microns in size, and glass fused to said substrate and to the sintered particles on the surface of said substrate.

References Cited in the file of this patent

UNITED STATES PATENTS

| | | |
|---|---|---|
| 1,884,665 | Greiner | Oct. 25, 1932 |
| 2,075,477 | Smith | Mar. 30, 1937 |
| 2,456,653 | Snow et al. | Dec. 21, 1948 |
| 2,523,155 | Shoupp | Sept. 19, 1950 |
| 2,555,877 | Doran | June 5, 1951 |
| 2,629,093 | Pask et al. | Feb. 17, 1953 |
| 2,650,683 | McPhee et al. | Sept. 1, 1953 |
| 2,664,180 | Peters | Dec. 29, 1953 |
| 2,722,085 | De Gier et al. | Nov. 1, 1955 |
| 2,771,969 | Brownlow | Nov. 27, 1956 |
| 2,814,165 | Goodwin | Nov. 26, 1957 |
| 2,821,811 | Hagenberg | Feb. 4, 1958 |